United States Patent [19]
Komiya

[11] Patent Number: 5,307,335
[45] Date of Patent: Apr. 26, 1994

[54] OPTICAL INFORMATION READING APPARATUS WITH MULTI FILM ELEMENTS TO COMPENSATE FOR WAVELENGTH FLUCTUATION

[75] Inventor: Masaaki Komiya, Akigawa, Japan

[73] Assignee: Olympus Optical Co., Ltd., Tokyo, Japan

[21] Appl. No.: 582,384

[22] Filed: Sep. 14, 1990

[30] Foreign Application Priority Data

Sep. 18, 1989 [JP] Japan ................. 1-240038

[51] Int. Cl.$^5$ ............................................... G11B 7/00
[52] U.S. Cl. ..................... 369/112; 369/110; 369/120
[58] Field of Search ............ 369/110, 112, 120, 44.11, 369/44.14, 109, 116, 120, 44.23, 44.24; 360/114; 359/605, 629, 832, 833, 834

[56] References Cited

U.S. PATENT DOCUMENTS

| | | | |
|---|---|---|---|
| 4,715,024 | 12/1987 | Musha | 369/110 |
| 4,721,368 | 1/1988 | Deguchi et al. | 369/110 |
| 4,730,297 | 3/1988 | Ishibashi et al. | 369/110 |
| 4,841,510 | 6/1989 | Yoshizawa | 369/122 |
| 4,873,678 | 10/1989 | Nakamura et al. | 369/110 |
| 5,004,326 | 4/1991 | Sasaki | 369/110 |
| 5,077,723 | 12/1991 | Yoshimatsu | 369/110 |

FOREIGN PATENT DOCUMENTS

| | | | |
|---|---|---|---|
| 0223842 | of 1987 | Japan . | |
| 0171438 | 7/1988 | Japan | 369/110 |
| 0014756 | 1/1989 | Japan | 369/110 |
| 0089044 | 4/1989 | Japan | 369/110 |
| 0223651 | 9/1989 | Japan | 369/110 |

Primary Examiner—Aristotelis Psitos
Assistant Examiner—Nabil Hindi
Attorney, Agent, or Firm—Stevens, Davis, Miller & Mosher

[57] ABSTRACT

An apparatus for optically reading information out of an opto-magnetic disk including a semiconductor laser emitting a polarized laser light beam which is made incident upon the opto-magnetic disk via beam splitter, reflection surface and objective lens. The light beam reflected by the opto-magnetic disk is made incident upon a photodetector by the objective lens and beam splitter. In order to compensate for the phase difference of P polarized and S polarized light components of the light beam reflected by the opto-magnetic disk within a wavelength over which the wavelength of the light beam might fluctuate due to the temperature variation, multi film constructions are provided in the beam splitter and reflection surface, the multi film constructions having such characteristics that the wavelength dependencies of the phase difference of the beam splitter and reflection surface can be made substantially a constant value such as zero and 90 degrees.

14 Claims, 11 Drawing Sheets

FIG_ 1A
PRIOR ART
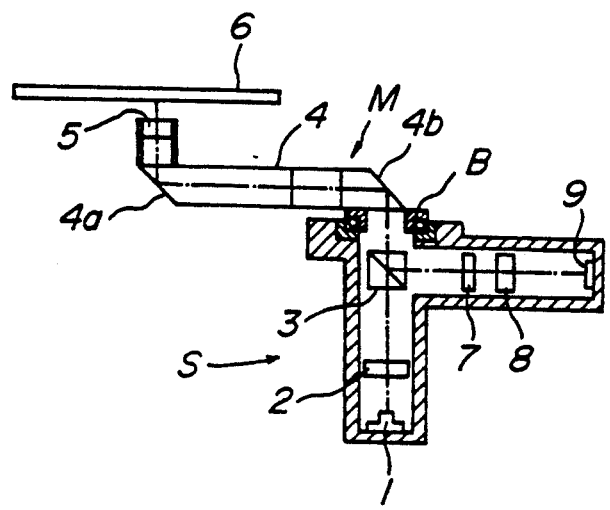
FIG_ 1B
PRIOR ART
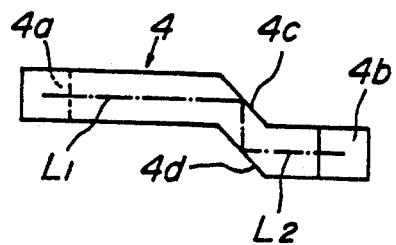

FIG._2A
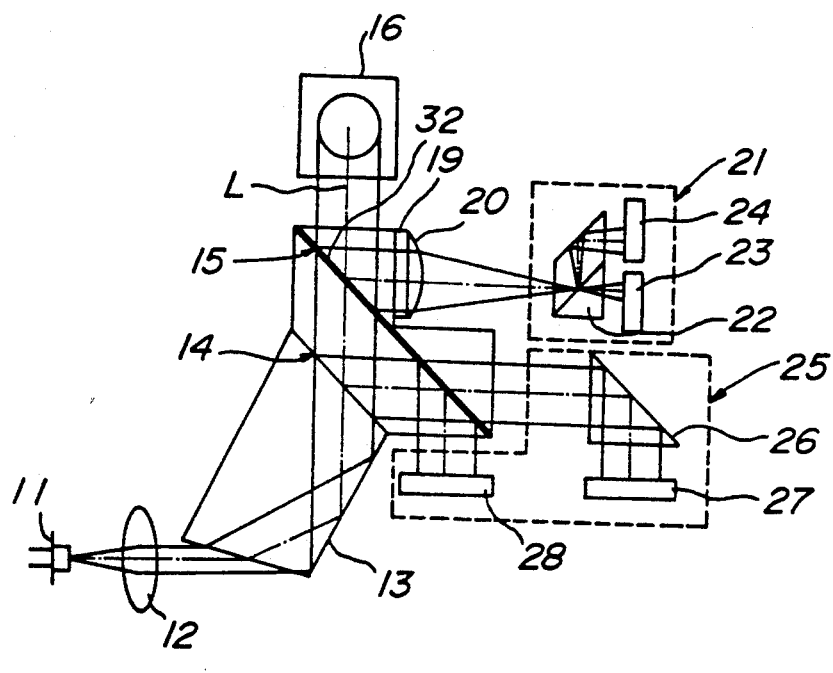
FIG._2B
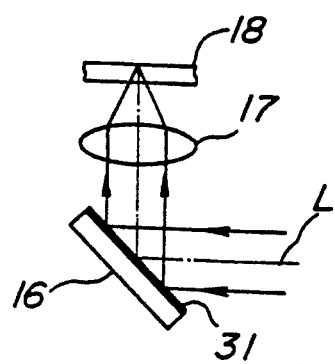

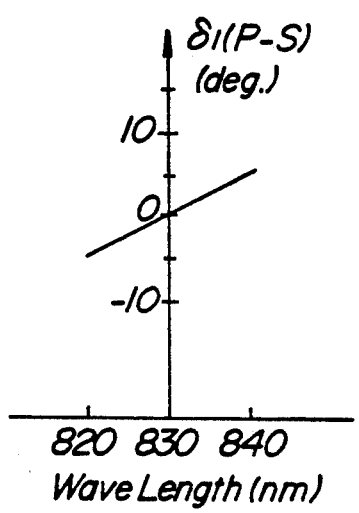
FIG_3A
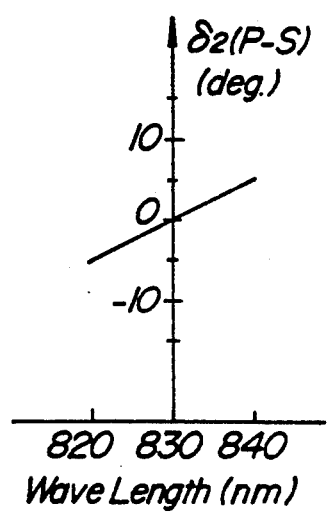
FIG_3B
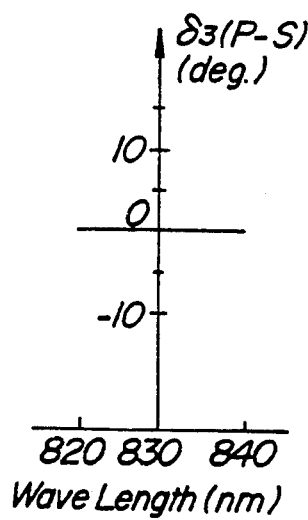
FIG_3C

FIG_4
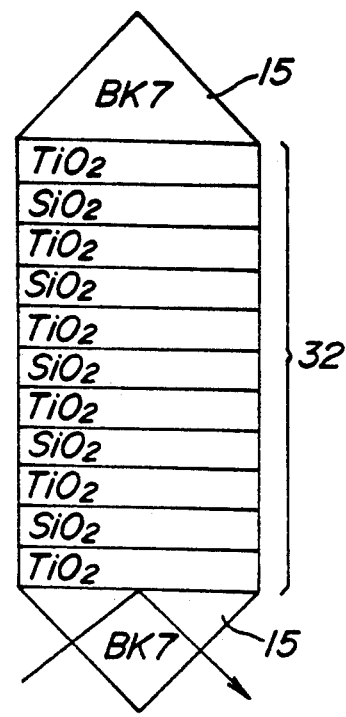
FIG_5A
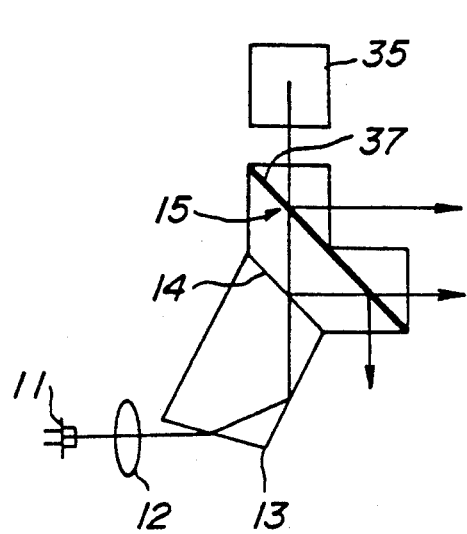
FIG_5B
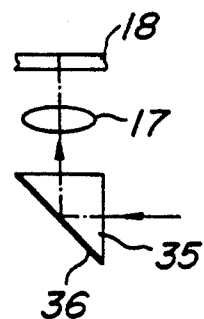

FIG_6
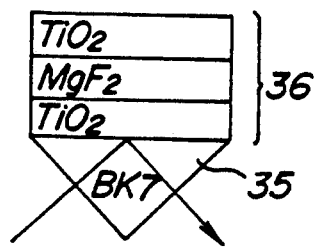
FIG_7A  FIG_7B  FIG_7C
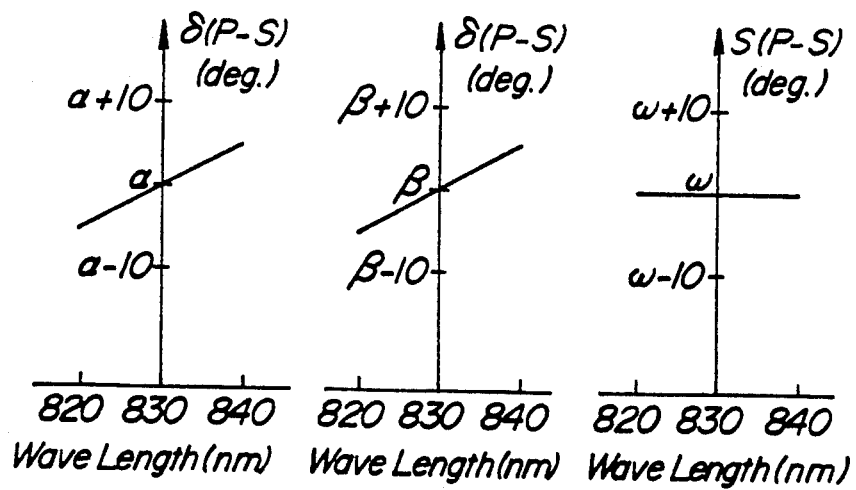

FIG_8A
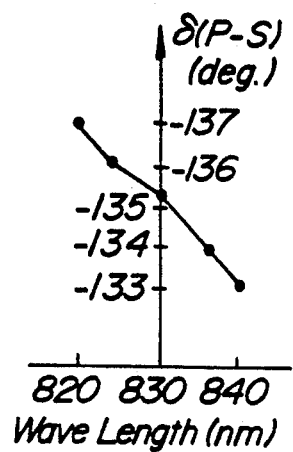
FIG_8B
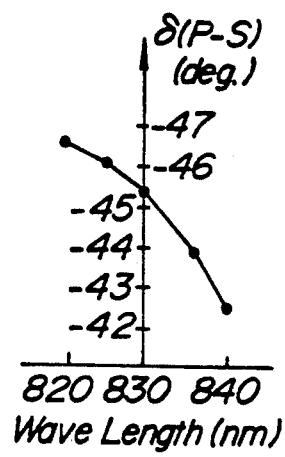
FIG_8C
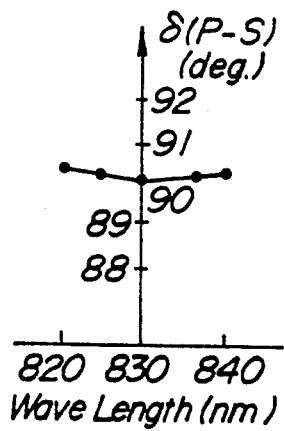

FIG_9A
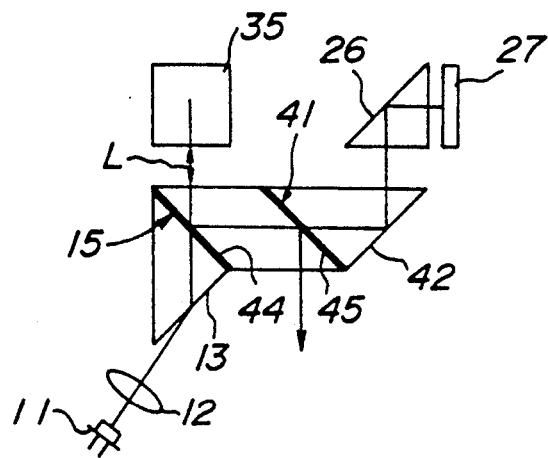
FIG_9B
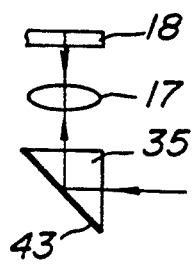

FIG_11
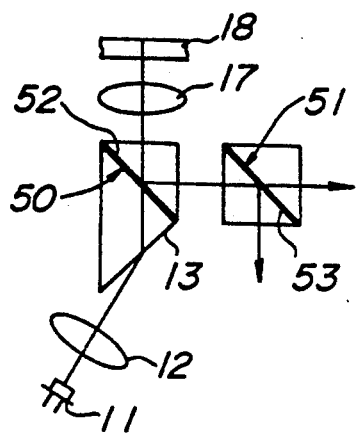
FIG_12A
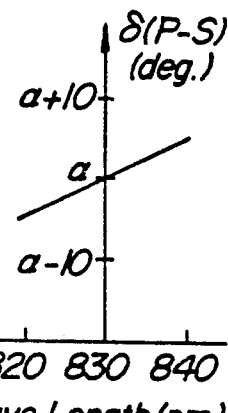
FIG_12B
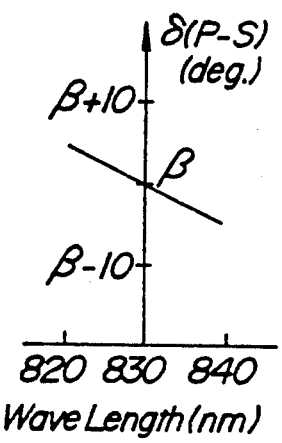
FIG_12C
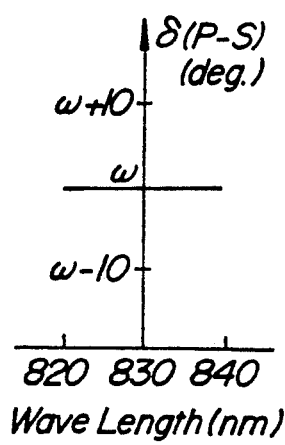

FIG_13A
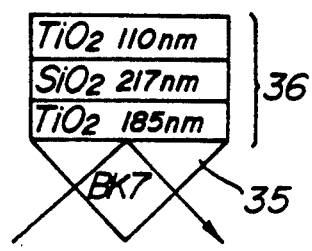
FIG_13B
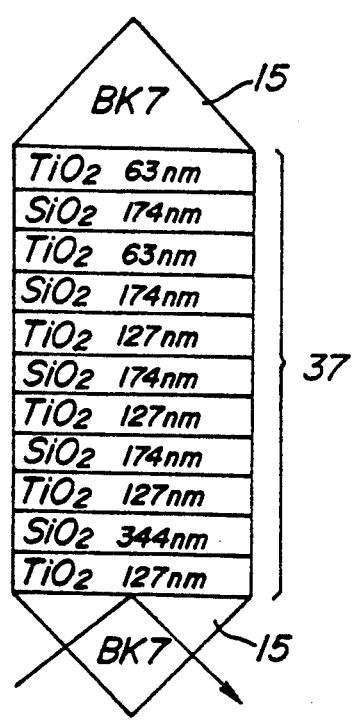

FIG_14A
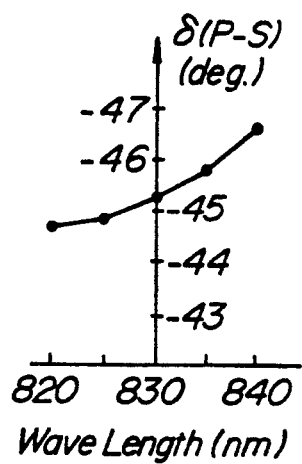
FIG_14B
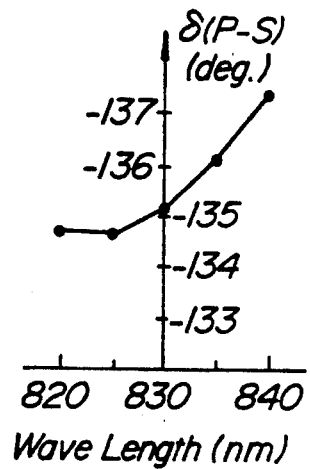
FIG_14C
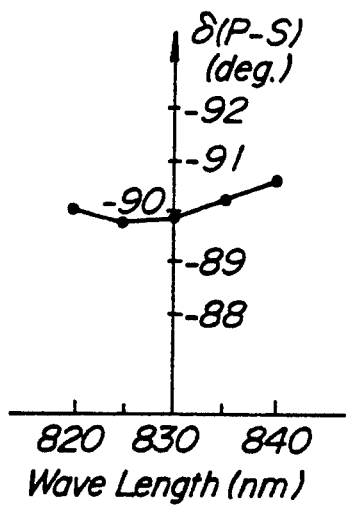

OPTICAL INFORMATION READING APPARATUS WITH MULTI FILM ELEMENTS TO COMPENSATE FOR WAVELENGTH FLUCTUATION

BACKGROUND OF THE INVENTION

Field of the Invention and Related Art Statements

The present invention relates to an apparatus for optically reading information out of an optical record medium such as opto-magnetic disk.

In U.S. Pat. No. 4,730,297, there is described a known apparatus for optically reading information out of an opto-magnetic disk. FIGS. 1A and 1B are schematic side and plan views, respectively showing this known apparatus for reading information recorded on an opto-magnetic disk. In this apparatus in order to move a light spot onto a desired information track promptly, the apparatus comprises a stationary unit S including semiconductor laser 1, collimator lens 2, beam splitter 3, analyzer 7, converging lens 8 and photodetector 9, and a movable unit M including light guide member 4 and objective lens 6. The movable unit M is movably secured to the stationary unit S by means of a bearing B such that the movable unit is rotatable about an optical axis of the stationary unit S. This known apparatus is sometimes called a separation and rotation type. A laser light beam emitted from the semiconductor laser 1 is converted into a parallel light beam by means of the collimator lens 2. The parallel light beam is then transmitted through the beam splitter 3 and is made incident upon an opto-magnetic disk 6 via the light guide member 4 and objective lens 5 arranged in the movable unit M. Light reflected by the opto-magnetic disk 6 is made incident upon the beam splitter 3 by means of the objective lens 5 and light guide member 4. The light beam is then reflected by the beam splitter 4 and is made incident upon the photodetector 9 by means of the analyzer 7 and converging lens 8. The photodetector 9 generates a reproduced signal which represents the information recorded in the opto-magnetic disk 6.

The light guide member 4 is formed by a prism having reflection surfaces. Therefore, there is introduced the retardation into the light beam reflected by the reflection surfaces. That is to say, there is produced a phase difference between the P and S polarized light components. Such a phase difference might deteriorate C/N of the reproduced signal. In order to remove the retardation, the light guide member 4 is constructed to have four reflection surfaces 4a to 4d as illustrated in a plan view of FIG. 1B. The reflection surface 4c is arranged to be rotated about an optical axis L1 by 90 degrees with respect to the reflection surface 4a, and the reflection surface 4d is provided to be rotated about an optical axis L2 by 90 degrees with respect to the reflection surface 4b.

In the known optical reading apparatus, the light guide member 4 is formed to include the four reflection surfaces 4a to 4d which are arranged as stated above, it is possible to cancel the phase difference between the P and S polarized light components. However, the construction of the light guide member 4 is liable to be complicated, large in size and expensive in cost. Moreover, the phase difference generated by the beam splitter could not be compensated for at all.

In Japanese Patent Laid-open Kokai Sho No. 62-223842, there is disclosed another known apparatus for optically reading the information recorded in the opto-magnetic disk. In this known apparatus, the light guide member 4 shown in FIG. 1B is formed by a parallelogram prism. In order remove the retardation the two reflection surfaces of the prism are formed by multi film constructions which have such optical characteristics that the retardations produced by the reflection surfaces are canceled out. However, in the known apparatus the thin film constructions are formed such that the retardations are canceled out at a predetermined wavelength. In practice, the phase difference has the wavelength dependency and when the wavelength of the light beam is varied, the phase difference could not be canceled out and C/N of the reproduced signal becomes worse. Therefore, when the wavelength of the laser light emitted by the semiconductor laser 1 fluctuates due to the variation in the output power and operating temperature, C/N of the reproduced signal is deteriorated. Further also in this known apparatus, the phase difference introduced by the beam splitter 3 is not taken into account. It should be noted that C/N of the reproduced signal is represented by the following equation:

$$C/N \alpha \sqrt{Rs} \cos(\delta + \theta k + \delta e)$$

wherein Rs denotes a reflectance of the optical system for the information component of the light beam, $\delta$ a phase difference of the optical system, $\theta k$ a Kerr rotation angle at the opto-magnetic disk 6 and $\delta e$ represents an initial phase difference of the optical system including the opto-magnetic disk 6. Therefore, when the phase difference $\delta$ is increased, C/N of the reproduced signal is decreased.

SUMMARY OF THE INVENTION

The present invention has for its object to provide a novel and useful apparatus for reading information out of an optical record medium which can be constructed small and less expensive and can generate the reproduced signal having a substantially constant C/N in regardless of the fluctuation in the wavelength of the light beam.

According to the invention an apparatus for reading information out of an optical record medium comprises
a light source means for emitting a light beam;
an incident optical system means for introducing the light beam emitted by the light source means onto the optical record medium; and
a detecting optical system means including a plurality of reflection surfaces for reflecting a light beam reflected by the optical record medium, at least two of said plurality of reflection surfaces having thin film constructions for compensating a phase difference due to a fluctuation in the wavelength of the light beam introduced into the detecting optical system means, and
a photodetector means for receiving the light beam emanating from the reflection surfaces.

BRIEF DESCRIPTION OF THE DRAWINGS

FIGS. 1A and 1B are cross sectional and plan views, respectively showing the known apparatus for reading information out of the optical record medium;

FIGS. 2A and 2B are plan and side views of a first embodiment of the optical information reading apparatus according to the invention;

FIGS. 3A, 3B and 3C are graphs for explaining the operation of the apparatus shown in FIGS. 2A and 2B;

FIG. 4 is a schematic cross sectional view illustrating the thin film construction according to the invention;

FIGS. 5A and 5B are schematic view depicting a second embodiment of the apparatus according to the invention;

FIG. 6 is a schematic view illustrating the thin film construction shown in FIGS. 5A and 5B;

FIGS. 7A, 7B and 7C are graphs for explaining the operation of the apparatus illustrated in FIGS. 5A and 5B;

FIGS. 8A, 8B and 8C are graphs for explaining the operation of the apparatus according to the invention;

FIGS. 9A and 9B are schematic views showing a third embodiment of the apparatus according to the invention;

FIG. 11 is a schematic view illustrating a fourth embodiment of the apparatus according to the invention;

FIGS. 12A, 12B and 12C are graphs for explaining the operation of the apparatus depicted in FIG. 11;

FIGS. 13A and 13B show multi-film constructions used in the second embodiment; and FIGS. 14A-14C illustrate wavelength dependencies of the multi-film constructions of FIGS. 13A and 13B.

DESCRIPTION OF THE PREFERRED EMBODIMENTS

Figure 10A:
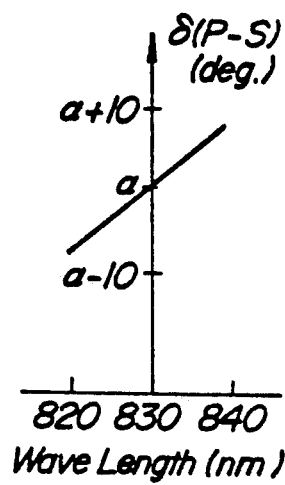
FIGS. 10A, 10B, 10C and 10D are graphs for explaining the operation of the apparatus illustrated in FIGS. 9A and 9B.

FIGS. 2A and 2B show an embodiment of the optical information reading apparatus according to the invention. A laser light beam emitted from a semiconductor laser 11 is converted into a parallel light beam by a collimator lens 12 and is then transmitted through a beam shaping prism 13. The laser beam having its cross sectional configuration being shaped is transmitted through beam splitters 14 and 15 and then is reflected by a reflection mirror 16. The laser beam reflected by the mirror 16 is then focused onto an optomagnetic disk 18 by means of an objective lens 17 as shown in FIG. 2B.

A light beam reflected by the opto-magnetic disk 18 is then made incident upon the beam splitters 15 and 14 by means of the objective lens 17 and mirror 16. Light reflected by the beam splitter 15 is transmitted through a half-wavelength plate 19, so that its polarization plane is rotated by 45 degrees. Then the light is converged by a converging lens 20 and is made incident upon a detecting optical system 21. The detecting optical system 21 includes a polarizing beam splitter 22 for separating the incident light into P and S polarized light beams, and a pair of photodetectors 23 and 24 for receiving the separated P and S polarized light beams. By deriving a difference between output signals from the photodetectors 23 and 24, it is possible to obtain a reproduced signal which represents the information recorded on the opto-magnetic disk 18.

A light beam reflected by the beam splitter 14 is further divided by the beam splitter 15 into transmitted and reflected light beams. The transmitted light beam is then made incident upon a focusing error signal detecting optical system 25 including a total reflection prism 26 and a photodetector 27 having two light receiving regions. The light beam reflected by the beam splitter 15 is made incident upon a photodetector 28 having four light receiving regions for detecting a tracking error and a beam off-set due to an inclination of optical axis. The total reflection prism 26 is arranged such that in an in-focused condition, the light beam impinging upon the prism is totally reflected by the prism. Then the focus error signal is obtained by deriving a difference between the output signals generated by the two light receiving regions. Such a focusing error detecting system has been known, so that its detailed explanation is dispensed with.

In the present embodiment, in order to remove the wavelength dependency of the phase difference of the light beam impinging upon the detecting optical system 21 multi film constructions 31 and 32 are provided on the reflection mirror 16 and beam splitter 15 such that the wavelength dependencies of the phase difference at the mirror 16 and beam splitter 15 are canceled out each other.

In the present embodiment, the reflection mirror 16 is made of a glass BK7 and the multi film construction 31 provided on the reflection mirror is formed by a stack of multi layers of dielectric materials having alternately different refractive induce. That is to say, odd numbered layers are made of $TiO_2$ and even numbered layers are made of $SiO_2$ or $MgF_2$. These dielectric layers may be formed by vapor deposition. Refractive indices of BK7 glass and $TiO_2$, $SiO_2$ and $MgF_2$ dielectric layers at the initial wavelength of 830 nm are 1.51, 2.27, 1.46 and 2.37, respectively. The thicknesses of these layers are determined such that there can be attained the wavelength dependency of the phase difference in which the phase difference $\delta_1$ becomes zero for an initial wavelength of 830 nm and has a positive inclination as illustrated in FIG. 3A. It should be noted that the phase difference $\delta_1$ is a difference between the phase of the P polarized light component and that of the S polarized light component and will be represented by (P-S) hereinafter.

The multi film construction 32 applied on the beam splitter 15 is formed to compensate for the wavelength dependency of the phase difference $\delta_1$ at the reflection mirror 16. That is to say, the beam splitter 15 is made of a glass BK7 and then the multi film construction 32 is formed by six $SiO_2$ layers and five $TiO_2$ layers which are arranged alternately as shown in FIG. 4 to have the wavelength dependency of the phase difference $\delta_2$(P-S) which becomes zero at the initial wavelength of 830 nm and has a positive inclination as illustrated in FIG. 3B. It should be noted that in the present embodiment the wavelength dependency of the multi film construction 32 is same as that of the multi film construction 31.

By forming the multi film constructions 31 and 32 as stated above, the wavelength dependency of the phase difference $\delta_3$(P-S) of the light beam impinging upon the detecting optical system becomes flat as shown in FIG. 3C, because the beam splitter 15 is arranged to be rotated about an optical axis L by 90 degrees with respect to the reflection mirror 16. Therefore, even if there is produced any phase difference due to the fluctuation in wavelength of the light beam emitted by the semiconductor laser 11 in accordance with the fluctuation of the output power and operating temperature of the semiconductor laser, C/N of the reproduced signal can be always maintained substantially constant without being influenced by the fluctuation in the wavelength. In this case, the multi film constructions 31 and 32 are sufficient to compensate for the wavelength dependency of the phase difference produced by the whole optical system and it is no more necessary to suppress the wavelength dependency of each of various optical elements, so that the freedom in designing the optical elements can be improved and the whole apparatus can be made small in size and cheap in cost.

FIGS. 5A and 5B denote a second embodiment of the optical reading apparatus according to the invention. In this embodiment, the reflection mirror 16 of the first embodiment is replaced by a reflection prims 35 and multi film constructions 36 and 37 are provided on the reflection prism 35 and beam splitter 15, respectively. In the present embodiment, the wavelength dependencies of the phase difference of the reflection prism 35 and beam splitter 15 can be canceled such that the light beam reflected by the beam splitter 15 has a substantially constant phase difference.

In the second embodiment, the reflection prism 35 is made of a glass BK7 and the thin film construction 36 is formed by two $TiO_2$ layers and one $MgF_2$ layer which is arranged between the $TiO_2$ layers as depicted in FIG. 6. Then the multi film construction 36 has the wavelength dependency in which the phase difference (P-S) at the initial wavelength 830 nm becomes $\alpha(0 \leq \alpha < 360°)$ and has a positive inclination. The multi film construction 37 applied on the beam splitter 15 is formed by a stack of six $TiO_2$ layers and five $SiO_2$ layers as illustrated in FIG. 4 and has the wavelength dependency in which the phase difference (P-S) at the initial wavelength 830 nm becomes $\beta(0 \leq \beta < 360°)$ and the inclination is positive.

Since the reflection surface of the beam splitter 15 is arranged to be rotated about the optical axis L by 90 degrees with respect to the reflection surface of the reflection prism 35, it is possible that the light beam reflected by the beam splitter 15 has a flat wavelength dependency having a constant phase difference $\omega$(P-s) as shown in FIG. 7C. Therefore, when $\omega$ is made zero like as the first embodiment it is possible to obtain the reproduced signal having a substantially constant C/N without being influenced by the fluctuation in the wavelength by introducing the light beam emanating from the beam splitter 15 into the detecting optical system 21 by means of the half wavelength plate 19 and converging lens 20.

When $\omega$ is made equal to 90 degrees, the light beam emanating from the beam splitter 15 is converted into an elliptically polarized light beam which rotates in the right hand direction or left hand direction in dependence upon the direction of the Kerr rotation. Therefore by introducing the light beam onto the detecting optical system by means of quarter wavelength plate and converging lens, it is also possible to derive the reproduced signal having a substantially constant C/N. That is to say, in this case the light beam impinging upon the detecting optical system 21 becomes elliptically polarized light beams whose major axes are perpendicular to each other, but being rotated in the same direction. Therefore, it is possible to mitigate the decrease in C/N of the reproduced signal due to any adjustment error of optical elements and C/N of the reproduced signal can be maintained substantially constant without being influenced by the fluctuation in the wavelength. Since the decrease in C/N of the reproduced signal can be mitigated, the optical elements can be assembled easily and thus the manufacturing cost of the apparatus can be reduced.

In case that the phase difference is set to $\omega$(P-s), the multi film construction 36 applied on the reflection prism 35 is formed by the three layer construction as illustrated in FIG. 6 to have the wavelength dependency of the phase difference (P-S) as shown in FIG. 8A and the multi film construction 37 provided in the beam splitter 15 has the eleven layer construction as depicted in FIG. 4 to have a wavelength dependency of the phase difference (P-S) shown in FIG. 8B. Then the wavelength dependency of the phase difference (P-S) of the light beam reflected by the beam splitter 15 can be maintained substantially 90 degrees as illustrated in FIG. 8C.

Also in the second embodiment, it is no more necessary to suppress the phase difference for respective optical elements, so that the freedom in design can be improved and further the whole apparatus can be made small in size.

FIGS. 9A and 9B show a third embodiment of the apparatus according to the invention. In the third embodiment, the light beam reflected by the optomagnetic disk 18 and beam splitter 15 is divided into two sub-beams by means of a beam splitter 41. The first sub-beam transmitted through the beam splitter 41 is made incident upon the focus error detecting photodetector 27 via reflection prism 42 and total reflection prism 26. The second sub-beam reflected by the beam splitter 41 is made incident upon the photodetector not shown to produce the reproduced signal. The remaining construction of the third embodiment is same as that of the second embodiment.

Figure 10B:
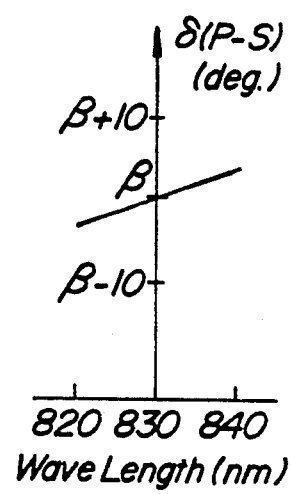
Figure 10C:
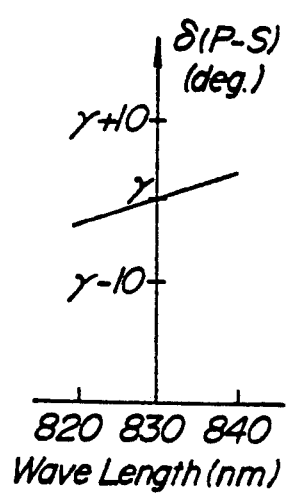

In the third embodiment, a multi film construction 43 is provided on the reflection prism 35 to give the light beam reflected by the opto-magnetic disk 18 a wavelength dependency of the phase difference (PS) such that a phase difference $\alpha$ becomes $\alpha(0 \leq \alpha < 360°)$ at the initial wavelength 830 nm and the inclination is positive as shown in FIG. 10A. A multi film construction 44 provided on the beam splitter 15 is formed to have the wavelength dependency in which the phase difference (P-S) becomes $\beta(0 \leq \beta < 360°)$ at the initial wavelength 830 nm and has positive inclination as illustrated in FIG. 10B. Further a multi film construction 45 is provided on the beam splitter 41. The multi film construction 45 has the wavelength dependency which has a phase difference $\gamma(0 \leq \gamma < 360°)$ at the initial wavelength and has a positive inclination as shown in FIG. 10C.

Figure 10D:
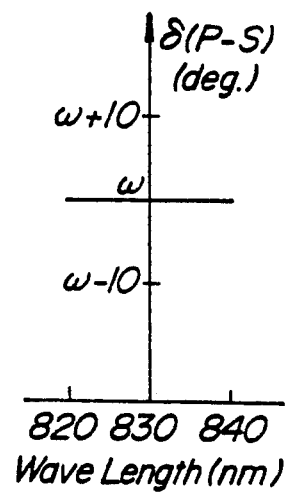

In the third embodiment, the reflection surfaces of the beam splitters 15 and 41 are arranged to be rotated about the optical axis L by 90 degrees with respect to the reflection surface of the reflection prism 35, so that the light beam emanating from the beam splitter 41 has a substantially constant phase difference $\omega$(P-s) even if the wavelength of the light beam is changed as depicted in FIG. 10D. In this manner the same advantageous effects as those of the previous embodiments can be obtained.

FIG. 11 shows a fourth embodiment of the apparatus according to the invention. In the present embodiment, a laser light beam emitted by the semiconductor laser 11 is converted into a parallel light beam by the collimator lens 12 and then a cross sectional shape of the parallel laser beam is corrected by the beam shaper 13. Then the light beam is transmitted through the beam splitter 50 and made incident upon the opto-magnetic disk 18 by means of the objective lens 17. The light beam reflected by the opto-magnetic disk 18 is collected by the objective lens 17 and is made incident upon the beam splitter 50. Then the light beam reflected by the beam splitter 50 is made incident upon a beam splitter 51 and is divided into two sub-beams, one of which is directed to the focus error detecting optical system and the other of which is introduced into the reproduced signal producing optical system.

A first multi film construction 52 is provided in the first beam splitter 50. The first multi film construction 52 has the wavelength dependency of the phase difference which shows the phase difference $\alpha(0 \leq \alpha < 360°)$ at the initial wavelength of 830 nm and has a positive inclination as shown in FIG. 12A. In the second beam splitter 51 there is provided a second multi film construction 53 having the wavelength dependency of the phase length which is represented by $\beta(0 \leq \beta < 360°)$ at the initial wavelength of 830 nm and has a negative inclination as illustrated in FIG. 12B. It should be noted that the absolute values of these positive and negative inclinations are substantially same.

FIGS. 13A and 13b show the multi film constructions which may be advantageously used in the second embodiment of the apparatus according to the invention. The first multi film construction provided on the reflection prism 35 made of a glass BK7 is formed by first thin film of $TiO_2$ having a thickness of 185 nm, a first $SiO_2$ film having a thickness of 217 nm and a second $TiO_2$ having a thickness of 110 nm. FIG. 14A shows the wavelength dependency of the thus formed first multi film construction 36. As shown in FIG. 14A the phase difference at the fundamental wavelength is about $-45.2$ degrees and the positive inclination. FIG. 13B illustrates the second multi film construction 37 provided in the beam splitter 15. The second multi film construction 37 is formed by six $TiO_2$ layers having thicknesses shown in FIG. 13B and five $SiO_2$ films having thicknesses denoted in FIG. 13B and has the wavelength dependency illustrated in FIG. 14B. As represented in FIG. 14B the phase difference of the second multi film construction 37 at the initial wavelength is about $-135.1$ degrees and the positive inclination. FIG. 14C shows the composite wavelength dependency of the first and second multi film constructions 36 and 37. At the initial wavelength the phase difference is about $-89.9$ degrees. The phase difference varies within a range from $-89.7$ to $-90.7$ degrees when the wavelength fluctuates from 820 to 840 nm.

It should be noted that the present invention is not limited to the above mentioned embodiments, but many modifications and alternations may be conceived by those skilled in the art within the scope of the invention. For instance, in the above embodiments the multi film constructions are provided in all the reflection surfaces arranged in the light path of the light beam reflected by the optical record medium, but according to the invention it is possible to provide the multi film construction on any one of the reflection surfaces. Further in the above embodiments the initial wavelength of the light emitted from the light source is set to 830 nm, but the present invention may be equally applied to cases in which the initial wavelength is set to any other value. Moreover, in the above embodiments the optical record medium is the opto-magnetic disk, but the present invention may be advantageously applied to any other optical record medium whose information is read out by the optical system including one or more polarizing films.

According to the invention, the multi film construction for compensating the variation of the phase difference due to the fluctuation of the wavelength of the light is provided in at least one reflection surface arranged in the optical path of the light beam reflected by the optical record medium and being introduced into the reproducing optical system. Therefore, even if the wavelength of the light emitted by the light source fluctuates, it is always possible to obtain the reproduced signal having substantially constant C/N. Further since the multi film construction can be provided to compensate for the wavelength dependency of the phase difference, it is no more necessary to suppress the wavelength dependency of the phase difference for respective optical elements. Therefore, the freedom of design can be improved and the whole apparatus can be made small in size and cheap in cost.

What is claimed is:

1. An apparatus for Optically reading information recorded on an optical record medium comprising:
   a light source means for emitting a light beam;
   an incident optical system means for introducing the light beam emitted by the light source means onto the optical record medium;,and
   a detecting optical system means disposed in a path of a light beam reflected by the optical record medium, said detecting optical system means including a plurality of reflection surfaces for reflecting a light beam reflected by the optical record medium, at least two of said plurality of reflection surfaces having multi film means for compensating for a phase difference due to a fluctuation in the wavelength of the light beam introduced into the detecting optical system means, and a photodetect for receiving the light beam emanating from the reflection surfaces.

2. An apparatus according to claim 1, wherein said detecting optical means includes one reflecting member and one beam splitter, and first and second multi film means are provided in said reflecting member and beam splitter, respectively.

3. An apparatus according to claim 2, wherein said reflecting member is formed by a reflection mirror.

4. An apparatus according to claim 2, wherein said reflecting member is formed by a reflection prism.

5. An apparatus according to claim 4, wherein said reflection prism and beam splitter are made of glass, and said first and second multi film means are formed by two kinds of thin layers made of dielectric materials having higher and lower refractive indices, said higher refractive index being higher than a refractive index of said glass.

6. An apparatus according to claim 5, wherein said reflection prism and beam splitter are made of a glass BK7, said first multi film means provided on the reflection prims is formed by two $TiO_2$ layers and one $MgF_2$ layer arranged between the $TiO_2$ layers, and said second multi film means provided in the beam splitter is formed by six $TiO_2$ layers and five $SiO_2$ layers arranged between successive $TiO_2$ layers.

7. An apparatus according to claim 1, wherein the detecting optical system includes a reflecting member and first and second beam splitters and a first multi film means is provided in the reflecting member and second and third multi film means are provided in the first and second beam splitters, respectively.

8. An apparatus according to claim 7, wherein said reflecting member is formed by a reflection mirror.

9. An apparatus according to claim 7, wherein said reflecting member is formed by a reflection prism.

10. An apparatus according to claim 4, wherein said reflection prism and first and second beam splitters are made of glass, and said first and second multi film means are formed by two kinds of thin layers made of dielectric materials having higher and lower refractive indices, said higher refractive index being higher than a refractive index of said glass.

11. An apparatus according to claim 10, wherein said reflection prism and first and second beam splitters are made of a glass BK7, said first multi film means provided on the reflection prims is formed by two $TiO_2$ layers and one $MgF_2$ layer arranged between the $TiO_2$ layers, and each of said second and third multi film means provided in the first and second beam splitters, respectively is formed by six $TiO_2$ layers and five $SiO_2$ layers arranged between successive $TiO_2$ layers.

12. An apparatus according to claim 1, wherein said multi-film means comprise means for maintaining the phase difference of the light beam impinging upon the photodetector means substantially at zero within a wavelength range over which the wavelength of the light beam fluctuates.

13. An apparatus according to claim 1, wherein said multi film means comprise means for maintaining the phase difference of the light beam impinging upon the photodetector means substantially at 90 degrees within a wavelength range over which the wavelength of the light beam fluctuates.

14. An apparatus according to claim 1, wherein said multi film means comprise means for successively imparting on the light beam a plurality of wavelength-dependent phase differences that result in a net wavelength-independent phase difference within a wavelength range over which the wavelength of the light beam fluctuates.

* * * * *